July 18, 1961 M. P. LAUGHLIN 2,992,689
ROTARY POWER LAWN EDGER AND GROOVER
Filed Oct. 17, 1956

United States Patent Office 2,992,689
Patented July 18, 1961

2,992,689
ROTARY POWER LAWN EDGER AND GROOVER
Myron P. Laughlin, 1705 Beach Drive SE.,
St. Petersburg, Fla.
Filed Oct. 17, 1956, Ser. No. 616,500
3 Claims. (Cl. 172—16)

This invention relates to lawn edgers of the power driven type wherein the edge of the lawn turf including sod, soil and grass are simultaneously trimmed.

It is the primary purpose of this invention to provide a rotary lawn edge trimmer which may be operated by a relatively low horsepower, high speed drive unit without intermediary speed change and without requirement for a heavy, weighty machine incapable of safe, easy manipulation by the average home owner.

In power driven lawn edgers of the type previously provided, it has been customary to rotate the blade in a plane substantially vertical to the lawn surface and to employ bar cutters of substantial diameter to obtain the desired cutting effect. Such devices have been cumbersome and considerable power was required to drive such cutters making a bulky machine requiring a large heavy prime mover while their use has been accompanied by considerable danger from thrown dirt and rocks hammered by the revolving cutter. In fact, the danger involved has, in many cases, prevented the use of such devices due to broken windows and injury hazard to bystanders from projected objects, even though guards were provided.

It is the purpose of this invention to eliminate the risks mentioned above, to cut the turf edge by relatively high speed cutters revolving in substantially the same plane as the lawn surface utilizing rotory cutters of such construction that any large stone or object of weight is pushed aside rather than picked up by the cutter. Thus risk from thrown objects is minimized and flexibility of maneuvering with corresponding ability to operate in small spaces is facilitated.

It is also a purpose of this invention to provide a lawn edger which can utilize a modern, very high speed, compactly built electric motor directly connected to a small, easily driven cutter and so mounted that the whole will be light in weight, low in cost and of maximum use to the average small lawn owner.

The appended drawings will show a preferred embodiment of my invention wherein the foregoing improvements are provided together with certain others which will appear as the attached description progresses.

Figure 5:
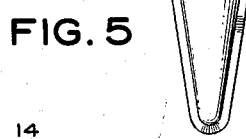
FIG. 5 shows a preferred form of cutter.
Figure 6:
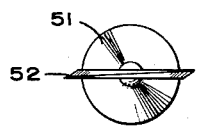
Figure 4:
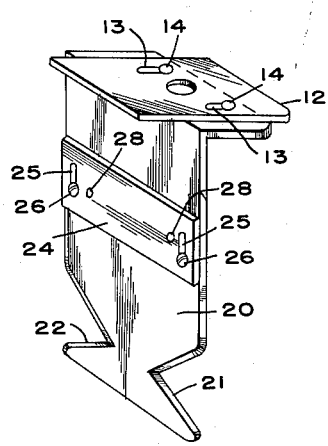
FIG. 4 shows the body and carriage part of the mechanism mentioned above.

FIG. 6 a bottom view of the cutter shown in FIG. 5.

Figure 1:
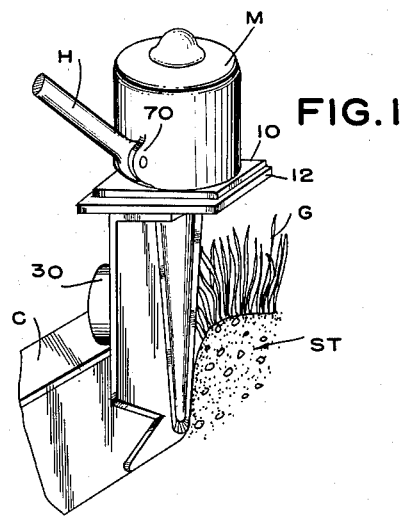
FIG. 1 is an elevation taken in perspective of an embodiment of my invention in use.

Referring to FIG. 1, M indicates an electric motor driven through a cord from an electrical supply (all omitted here for purposes of simplicity). Motor M is preferably mounted through a resilient ring 10 upon motor seat 12 adjustably secured as by slots 13, bolts 14 to a bracket-like portion of main body 20. Body 20 is preferably provided at its lower end with back blades 21 and 22 which serve to hook into the soil and steady the whole in operation. Body 20 may also be provided upon its side with a carrier bracket 24 secured to it by adjustable slots 25 and bolts 26. Bracket 24 has mounting holes 28 for axle pins 29 of wheels 30.

Figure 2:
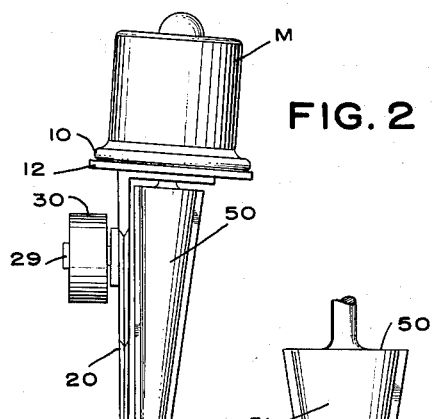
FIG. 2 is an end elevation of the edger mechanism.
Figure 3:
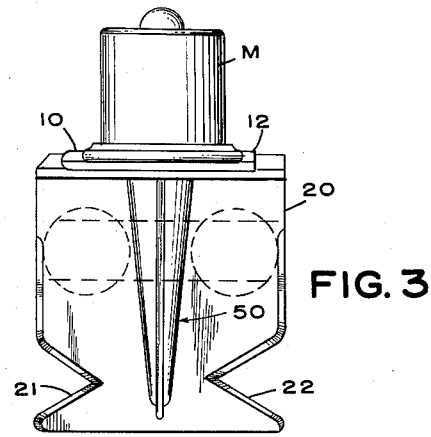
FIG. 3 is a side elevation of the device shown in FIGS. 1 and 2.

The shaft of motor M projects downwardly to support and rotate a tapered cutter 50 having an elongated body 51 and a blade 52 projecting slightly from said body at either side, as shown. The motor support portion of body 20 may be inclined as shown in FIG. 2 so that the tapering cutter runs adjacent the body and by its outward taper cut back the soil and turf ST and the grass G as shown in FIG. 1. It will be evident that due to the cutter taper, the edge of the blade, where contacting the grass, will have much greater required peripheral cutting speed than where the soil is "routed" out. The clearance between cutter and body is, of course, adjustable through the bolts 14 and the slots 13 and a certain flexibility provided by ring 10 as described. Bolts 26 and slots 25 provide means whereby the wheels 30 may be adjusted vertically relative to the lawn curb C (FIG. 1) or like supporting surface, thus regulating the depth of the cut into the soil and turf ST. It will be understood that the action here is similar to that of a routing cutter rather than the saw and hammer-like devices heretofore employed and it will be clear to those familiar with such devices that cutter 50 is best driven at very high speed and hence electric motors providing requisite power though relatively small in size and light in weight, will be available for direct drive. It will be equally obvious that since only a small projection of the cutter blade 52 is presented, insufficient blade area will be presented to pick up rocks or other articles of any size and that such small pebbles and sand as may be caught will be projected downward against the grass or against body 20 rather than upward and outward. A suitable handle H may be secured through the brackets 70, to the motor M for convenient manipulation and it will be understood that the double back blades 21 and 22 permit the device to be pushed away from or drawn to the operator as desired. These back blades serve to steady the whole and to draw the body 20 firmly downward against rollers 30. It will also be understood that while rollers have been shown here, shoes and like supporting devices, common to the art, may be equally well utilized.

The foregoing description and the appended drawings will serve to illustrate that my invention is capable of being embodied in an extremely simple, light weight mechanism and make clear to those skilled in the art that many modifications in the whole and in the parts thereof may be made well within the scope of my invention and the spirit of the appended claims.

I claim:

1. A high speed rotary lawn edger including a frame having a longitudinally and vertically extending guide means for supporting and directing said edger along a lawn demarcation line, a drive motor mounted on said frame, an elongated tapered rotary cutter also mounted on said frame for direct drive by said motor and being of downwardly tapering conical shape having a substantially vertical axis and having substantially vertically extending cutting blades arranged about its periphery, and one side of said cutter being arranged close to and parallel to said guide means.

2. A high speed rotary lawn edger having a frame, a longitudinally and vertically extending cutter and guide blade mounted on said frame for supporting and directing said edger along a lawn demarcation line, means on said cutter and guide blade for engaging a lawn and adjacent surfaces for retaining said edger against downward vertical displacement, said cutter and guide blade having a back blade portion projecting beneath the main body thereof and a turf to be cut to hold down and guide the cutter blade, a downwardly tapering conical grooving tool rotating on a substantially vertical axis arranged closely adjacent and parallel to one face of the cutter blade and having substantially vertically extending cutting blades arranged about its periphery.

3. The device according to claim 2 wherein the means on said cutter and guide blade for engaging the lawn and adjacent surfaces comprises a pair of ground engaging rollers mounted on horizontal axes.

References Cited in the file of this patent

UNITED STATES PATENTS

| | | |
|---|---|---|
| 1,970,838 | Buettner | Aug. 31, 1934 |
| 2,541,284 | Presswood | Feb. 13, 1951 |
| 2,718,838 | Schumacher | Sept. 27, 1955 |
| 2,737,105 | Wilson | Mar. 6, 1956 |
| 2,779,259 | Kelsey | Jan. 29, 1957 |

FOREIGN PATENTS

| | | |
|---|---|---|
| 103,743 | Great Britain | Feb. 8, 1917 |